United States Patent
Sato

(10) Patent No.: US 7,543,751 B2
(45) Date of Patent: Jun. 9, 2009

(54) PLAY TOY EQUIPPED WITH BARCODE READER AND BARCODE READER FOR PLAY TOY

(75) Inventor: Hachitaro Sato, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 535 days.

(21) Appl. No.: 10/559,922

(22) PCT Filed: Jun. 7, 2004

(86) PCT No.: PCT/JP2004/007939

§ 371 (c)(1),
(2), (4) Date: Jan. 26, 2006

(87) PCT Pub. No.: WO2004/108243

PCT Pub. Date: Dec. 16, 2004

(65) Prior Publication Data

US 2007/0080227 A1  Apr. 12, 2007

(30) Foreign Application Priority Data

Jun. 9, 2003  (JP)  ............................. 2003-164439

(51) Int. Cl.
*G06K 7/10*  (2006.01)
(52) U.S. Cl. .............................. 235/462.2; 235/462.01
(58) Field of Classification Search ................................. 235/462.01–462.49
See application file for complete search history.

(56) References Cited

U.S. PATENT DOCUMENTS

| | | | | |
|---|---|---|---|---|
| 5,212,368 A | * | 5/1993 | Hara | ........................... 235/375 |
| 5,602,379 A | * | 2/1997 | Uchimura et al. | ...... 235/462.11 |
| 6,036,094 A | * | 3/2000 | Goldman et al. | ........ 235/462.45 |
| 6,131,815 A | * | 10/2000 | Zigler | .................... 235/472.01 |
| 6,532,314 B1 | * | 3/2003 | Plain et al. | ................... 382/312 |
| 6,622,916 B1 | * | 9/2003 | Bianco | ........................ 235/454 |

FOREIGN PATENT DOCUMENTS

| | | |
|---|---|---|
| JP | 02-232789 | 9/1990 |
| JP | 03-118800 | 12/1991 |
| JP | H 3-118800 | 12/1991 |
| JP | 04-354086 | 12/1992 |
| JP | 06-165883 | 6/1994 |

* cited by examiner

*Primary Examiner*—Jamara A Franklin
(74) *Attorney, Agent, or Firm*—Rankin, Hill & Clark LLP

(57) ABSTRACT

A play toy equipped with a barcode reader, which has a simple structure and is capable of outputting detection accuracy required for play toy, is provided. A guide member 57 extending parallel to openings of a movable member 37 is received within a reader body of the barcode reader. A barcode sensor holder 59, which slidably holds barcode sensors on the guide member 57, is mounted. There is provided a rotation link 61 of which one end rotates on a rotation center axle 65 and the other end thereof slidably connected to the barcode sensor holder 59. Using energy released from a first spring 67, the rotation link 61 is rotated to move the barcode sensor holder 59 from one end to the other end of the opening 41. Using energy released from a second spring 70, the rotation link 61 is rotated in reverse on the rotation center axle 65 to return the barcode sensor holder 59 from the other end to the one end of the opening 41.

17 Claims, 9 Drawing Sheets

(A)

(B)

(C)

Farther Forward Position

Closer Forward Position

PLAY TOY EQUIPPED WITH BARCODE READER AND BARCODE READER FOR PLAY TOY

TECHNICAL FIELD

The present invention relates to a play toy, a barcode reader for the play toy and a barcode readable with the barcode reader for the play toy. The play toy reads the barcode indicated on an article such as a seal, card or book by using the barcode reader equipped with a barcode sensor, and develops play based on a readout result by the barcode reader.

BACKGROUND ART

Japanese Patent Application Laid-Open No. 354086/1992 and Japanese Patent Application Laid-Open No. 165883/1994 disclose play toys that provide a barcode indicated on an article and a barcode reader for reading the barcode to develop play based on the barcode readout result. For example, the art disclosed in the Japanese Patent Application Laid-Open No. 165883/1994 employs a CCD camera as a barcode sensor for a barcode reader. Also, the art disclosed in the Japanese Patent Application Laid-Open No. 354086/1992, in addition to a barcode sensor, uses a proximity sensor to eliminate problems caused by a small displacement.

Patent document 1: Japanese Patent Application Laid-Open 354086/1992
Patent document 2: Japanese Patent Application Laid-Open 165883/1994

DISCLOSURE OF THE INVENTION

PROBLEM TO BE SOLVED BY THE INVENTION

Barcode readers employed in the conventional play toys were fairly satisfactory in detection accuracy, but the unit price thereof was too expensive. That was one of the major causes to increase a price of a play toy. When using an inexpensive barcode reader, a player moved the barcode reader in respect to the barcode to read the barcode. When moving the barcode reader, detection accuracy could be considerably poor, depending on a positional relationship between the barcode and the barcode reader and/or on a moving speed thereof. Therefore, such a barcode reader was not appropriate to use for a child.

An object of the invention is to provide a play toy equipped with a barcode reader in a simple structure, having higher detection accuracy required for the play toy, and a barcode reader for the play toy.

Another object of the invention is to provide a play toy equipped with a barcode reader with which detection accuracy does not fluctuate largely, even when used by a child and a barcode reader for the play toy.

Still another object of the invention is to provide a play toy equipped with a barcode reader capable of providing detection accuracy required for the play toy without using a battery or a motor, and a barcode reader for the play toy.

Still another object of the invention is to provide a play toy equipped with a barcode reader, which is easy to be assembled and includes a small number of components, and a barcode reader for the play toy.

Still another object of the invention is to provide a barcode, which is ensured to read out data included in the barcode, even when the barcode sensor is moved at an irregular speed.

Another object of the invention is to provide a play toy equipped with a barcode reader, which is useful for intellectual education of children.

MEANS FOR SOLVING THE PROBLEMS

An object of the invention is to improve a play toy equipped with a barcode reader, which reads a barcode indicated on an article such as a seal, card or book using a barcode reader provided with a barcode sensor, and develops play based on a barcode readout result. The barcode sensor may be arbitrarily structured. For example, a barcode sensor having a typical structure in which a pair of a light emitting section and a light receiving section may be employed. The number of barcode sensors corresponding to the number of the barcode patterns included in the barcode is used.

The barcode reader includes a reader body which is to be held by a player with hands, a movable member which is movably held by the reader body, and a barcode sensor moving mechanism. The movable member is formed with an opening for guiding light beams reflected from the barcode to the barcode sensor, and movably held by the reader body so as to be relatively moved with respect to the reader body between a farther forward position and a closer forward position as viewed from the reader body. That is, just before or at the point when the movable member is brought into contact with the article, the movable member is positioned at the farther forward position. When the player brings the reader body closer toward the article or brings the article closer toward the reader body, a relative positional relationship between the movable member and the reader body is changed, that is, the movable member is moved from the farther forward position toward the closer forward position. In other words, the movable member is held by the reader body so as to be relatively moved with respect to the reader body from the farther forward position to the closer forward position while being pressed onto an article. And also the movable member is held by the reader body so as to be relatively moved with respect to the reader body from the closer forward position to the farther forward position when pressing of the movable member onto the article is released.

The barcode sensor moving mechanism is a mechanical arrangement capable of moving the barcode sensor within a movable range corresponding to the opening of the movable member without using electrical drive power such as a motor. The barcode sensor moving mechanism used in the invention includes an energy storage means which is energized while the movable member is being pressed onto the article. Herein, the energy storage means is typically a spring capable of storing mechanical energy in a mechanical or physical manner (i.e., capable of storing the energy) and releasing the stored mechanical energy (i.e., capable of releasing the energy), such as a spring. The barcode sensor moving mechanism is so constructed as to move the barcode sensor from one end to the other end of the opening, using energy released from the energy storage means. As described above, when the barcode sensor is moved using the energy storage means which is energized while the movable member is moved as the power source, no electrical power source such as a motor or battery has to be provided to the barcode reader. As a result, not only the barcode reader can be structured simply but also the weight thereof is reduced. Also, since the price of the barcode reader can be reduced, the price of the play toy can be reduced.

The barcode sensor moving mechanism may be arbitrarily structured. For example, the barcode sensor moving mechanism can be so structured to comprise a guide member, a barcode sensor holder, and a rotation link. The guide member extends parallel to the opening. The barcode sensor holder is slidably mounted on the guide member for holding the barcode sensor. The rotation link has one end thereof rotatably mounted on a rotation center axle and the other end thereof slidably connected to the barcode sensor holder. The rotation link is so constructed as to rotate on the rotation center axle, thereby allowing the barcode sensor holder to reciprocate along the guide member. By arranging as described above, the barcode sensor holder moves by being guided by the guide member. Therefore, since the distance between the barcode sensor and the barcode is kept constant, the reading error can be prevented. Also, by rotating the rotation link on the rotation center axle to allow the barcode sensor to move along the guide member, not only the link of the barcode sensor moving mechanism can be structured simply, but also the fluctuation of the moving speed of the barcode sensor holder can be reduced. Accordingly the reading accuracy can be prevented from decreasing.

The structure for returning the movable member from the closer forward position to the farther forward position may be arbitrary. For example, the barcode sensor moving mechanism includes first and second energy storage means, which are energized while the movable member is being pressed onto the article. In this case, the barcode sensor moving mechanism is so constructed as to move the barcode sensor from one end to the other end of the opening using energy released from the first energy storage means, and to move the barcode sensor from the other end to the one end of the opening using energy released from the second energy storage means when pressing of the movable member onto the article is released. By employing two energy storage means as described above, the shifting movement of the barcode sensor and the return movement of the movable member can be carried out using the separate energy storage means. Therefore, the barcode sensor moving mechanism can be designed easily, and both of the shifting movement and the return movement can be carried out smoothly.

In the case where the first and the second energy storage means are used, the barcode sensor moving mechanism is constituted of, in particular, an energy storing mechanism, a trigger mechanism and a movement link mechanism. The energy storing mechanism is constituted of the first energy storage means and the second energy storage means. Furthermore, the energy storing mechanism is so constructed as to energize the first energy storage means and the second energy storage means, while the movable member being moved from the farther forward position toward the closer forward position. The trigger mechanism is so constructed as to release the energy of the first energy storage means when the movable member has reached a predetermined position, while the movable member is being moved from the farther forward position toward the closer forward position. The movement link mechanism is so constructed that the barcode sensor is moved from one end to the other end of the opening using energy released from the first energy storage means. And the movement link mechanism is also so constructed that the barcode sensor is moved from the other end to the one end of the opening using energy released from of the second energy storage means when pressing of the movable member onto the article is released. When the movement link mechanism is constructed as described above, the barcode sensor and the barcode sensor moving mechanism are preferably received inside the movable member to facilitate the assembly of the barcode reader. The energy storing mechanism is preferably constructed so that a part of an energy storing link constituting the energy storing mechanism abuts on a part of the reader body, thereby allowing the movable member to stay at the farther forward position when the movable member is not pressed onto the article. Furthermore the energy storing mechanism is preferably constructed so that the first energy storage means and the second energy storage means are energized using force applied to the energy storing link when the movable member is relatively moved with respect to the reader body while being pressed onto the article. With the above arrangement, a mechanism to move the movable member toward the reader body is not required. Therefore, since the structure of the reader body is simple, the barcode reader can be assembled extremely easily.

The energy storing mechanism can be constructed of an energy storing link, a first spring (a first energy storing means), and a second spring (a second energy storing means). The energy storing link has a first arm portion and a second arm portion, and rotates within a predetermined angular range on the rotation center axle. The first spring is disposed between a rotation link included in the movement link mechanism. The first spring is fixed to the rotation link at one end thereof, and to the second arm portion at the other end thereof. The second spring is fixed to the movable member at one end thereof and to the second arm portion at the other end thereof. And in this case, the energy storing mechanism is constructed in such a manner that the first and second springs are energized by a rotation of the energy storing link due to the force applied to the first arm portion, when the movable member is relatively moved from the farther forward position to the closer forward position. And it is constructed in such a manner that the energy storing link is reversely rotated using the energy released from the second spring while pressing of the movable member onto the article is being released, thereby allowing the movable member to move from the closer forward position to the farther forward position. In this structure, since the barcode reader can be assembled while bringing the first arm portion of the energy-storing link into contact with a part of the reader body, the barcode reader can be assembled easily. Since the first and second springs can be energized by the rotational movement of the energy storing link while the first arm portion is pressed onto a part of the reader body, not only the structure of the energy storing mechanism can be made simple, but also the number of the required parts can be reduced. Furthermore, the movable member can be returned to the farther forward position by rotating the energy-storing link in reverse using energy released from the second spring. Therefore, since such a mechanism to move the movable member toward the reader body is not required, the reader body can be structured simply, thus, the barcode reader can be manufactured easily.

It is preferred that the barcode includes a first barcode pattern having information and a second barcode pattern. The second barcode pattern has a reference barcode row constituted of a plurality of bars which have a constant width dimension and are disposed at constant intervals. Also the second barcode pattern is arranged parallel with the first barcode pattern. In this case, each bar of the first barcode pattern is indicated, being aligned with the plurality of bars of the reference barcode row of the second barcode pattern. The barcode reader includes the first and second barcode sensors for reading the first and second barcode patterns respectively. If the information of the first barcode pattern can be obtained when a bar included in a reference barcode row in the second barcode pattern is read out, it is ensured that necessary information can be read out from the first barcode pattern, even when the moving speed of the barcode sensor is not constant.

The play toy of the invention is further equipped with a data processing section, a memory, display means and a data use regulating means. The data processing section processes the data read out by the barcode reader. The memory stores the data necessary for data processing in the data processing section. The display means displays the processing result of the data processing section. The data use regulating means regulates the use of the data stored in the memory. The data use regulating means includes m key members, which is provided corresponding to the m types of data groups (m is an integer) stored in the memory, and a key member insertion section, which allows the m key members to be inserted thereinto and a key member determination section, which determines what key member in the m key members is inserted and permits only the data group corresponding to an inserted key member to be used in the data processing section. When the data use regulating means as described above is employed, it is necessary to select a key member and the correct key member insertion section, into which the key member should be inserted. Accordingly, a player playing with the play toy develops abilities of thinking. Also, since the data groups to be used by inserting the key member are limited, the data processing section performs only a simple data processing operation. Therefore, the data processing section may be constituted of an inexpensive microcomputer, which handles a small bit number. Accordingly the price of the play toy can be reduced.

BEST MODE FOR IMPLEMENTING THE INVENTION

Figure 1:
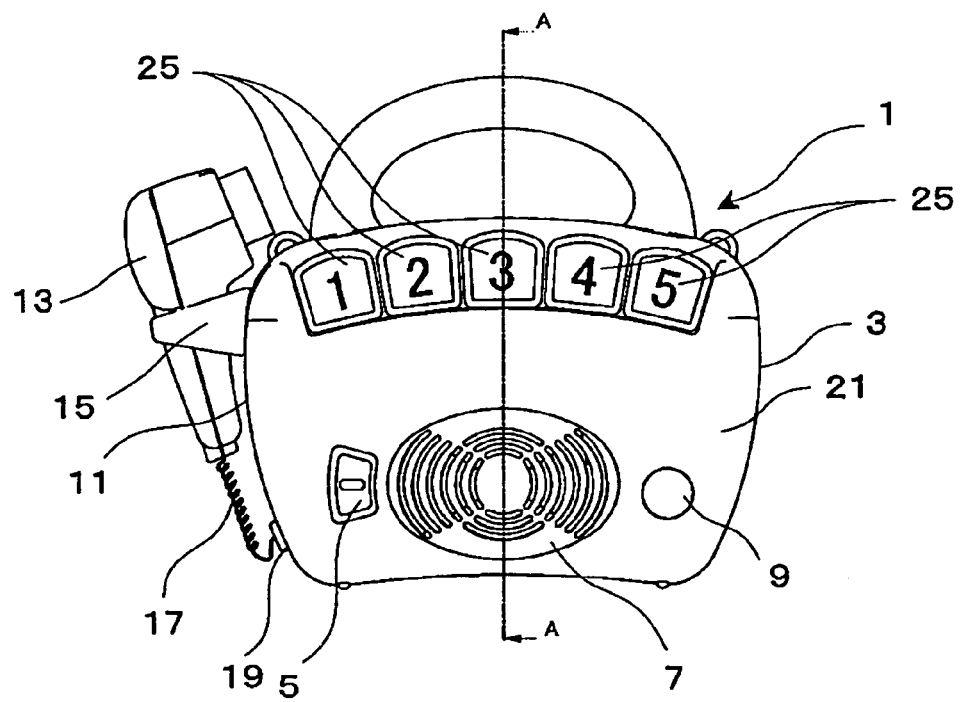
FIG. 1 is a front elevation view of an embodiment in which the invention is applied to a play toy equipped with a barcode reader for intellectual education.
Figure 2:
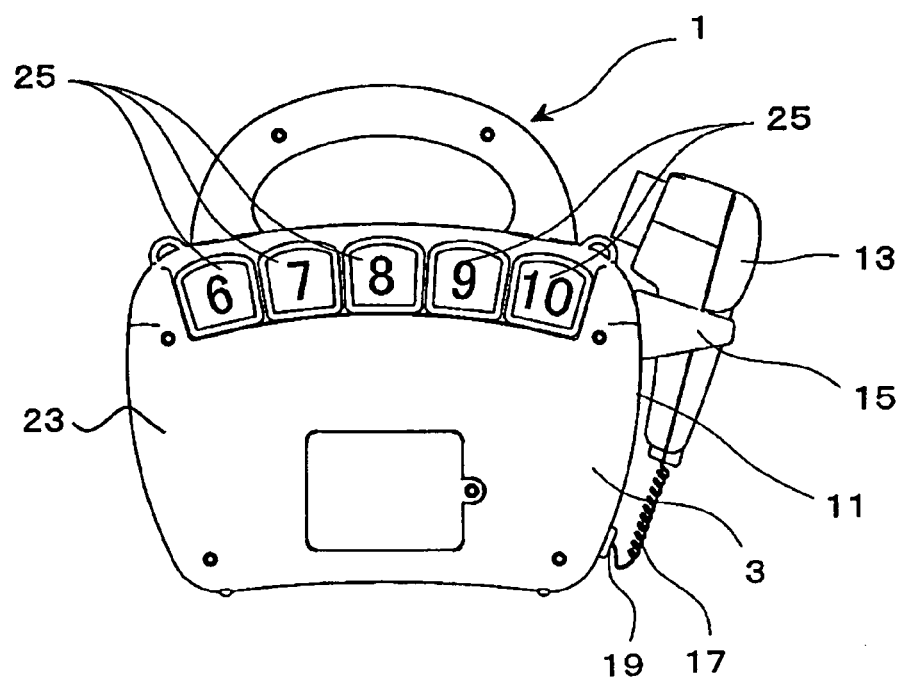
FIG. 2 is a rear elevation view of the embodiment in which the invention is applied to the play toy equipped with the barcode reader for intellectual education.
Figure 3:
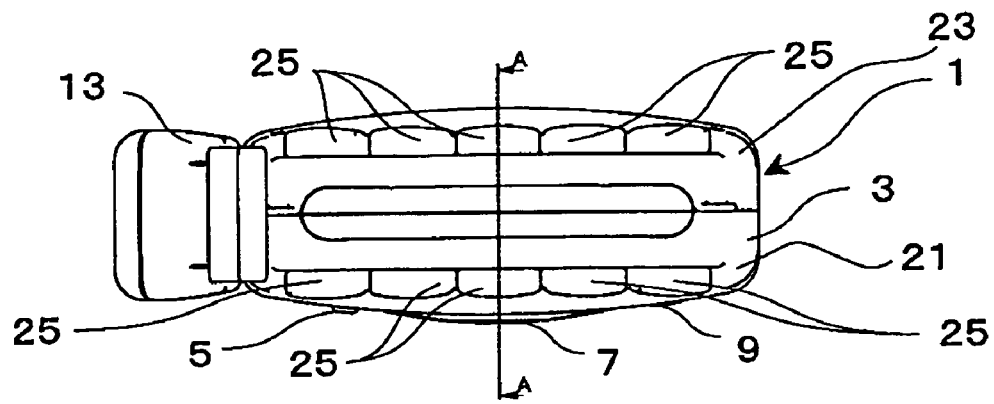
FIG. 3 is a top plan view of the embodiment in which the invention is applied to the play toy equipped with the barcode reader for intellectual education.
Figure 4:
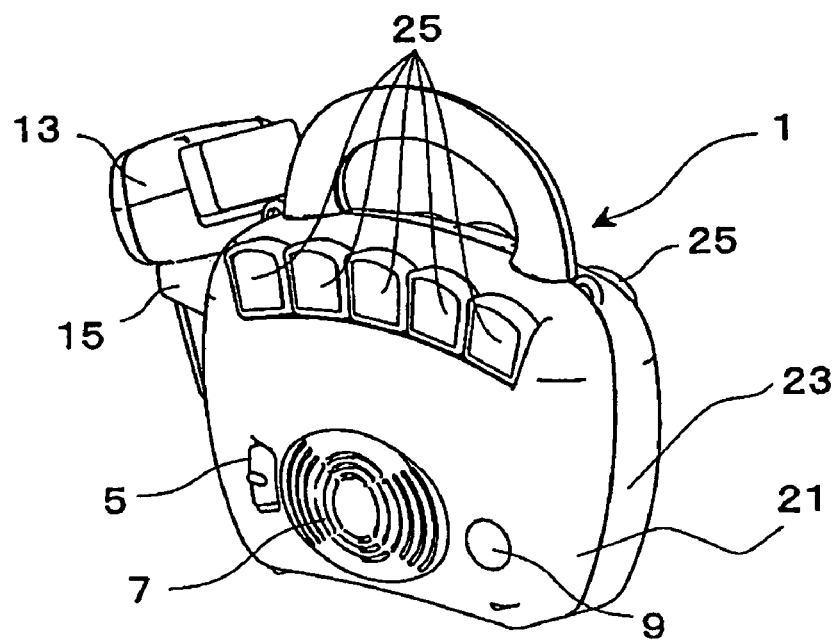
FIG. 4 is a perspective view of the embodiment in which the invention is applied to the play toy equipped with the barcode reader for intellectual education.

Hereinafter, an embodiment of a play toy equipped with a barcode reader in accordance with the invention will be described in detail with reference to the drawings. FIG. 1 to FIG. 5 are a front elevation view, a rear elevation view, a top plane view, a perspective view and a cross sectional view taken along the line A-A in FIG. 1, respectively, of an embodiment in which the invention is applied to a play toy 1 equipped with a barcode reader for intellectual education. In the front face of a play toy device 3 with a handle, a power switch 5, a sound outputting section 7 of a speaker 6 and an auxiliary switch 9 are provided. On the side surface 11 of the play toy device 3, a barcode reader holder 15 for holding a barcode reader 13 is provided. Also, an outlet 19 for a cord 17 extending from the barcode reader 13 is provided at the side surface 11.

Figure 5:
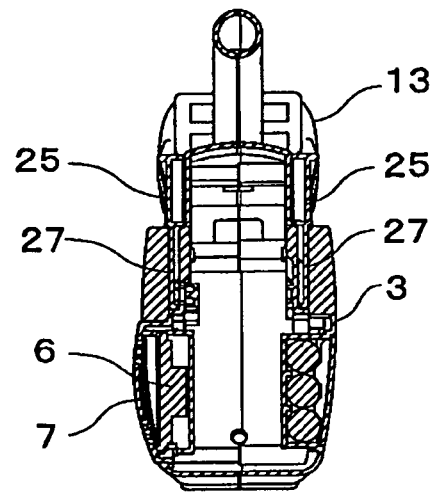
FIG. 5 is a cross sectional view taken along the line A-A in FIG. 1.
Figure 6:
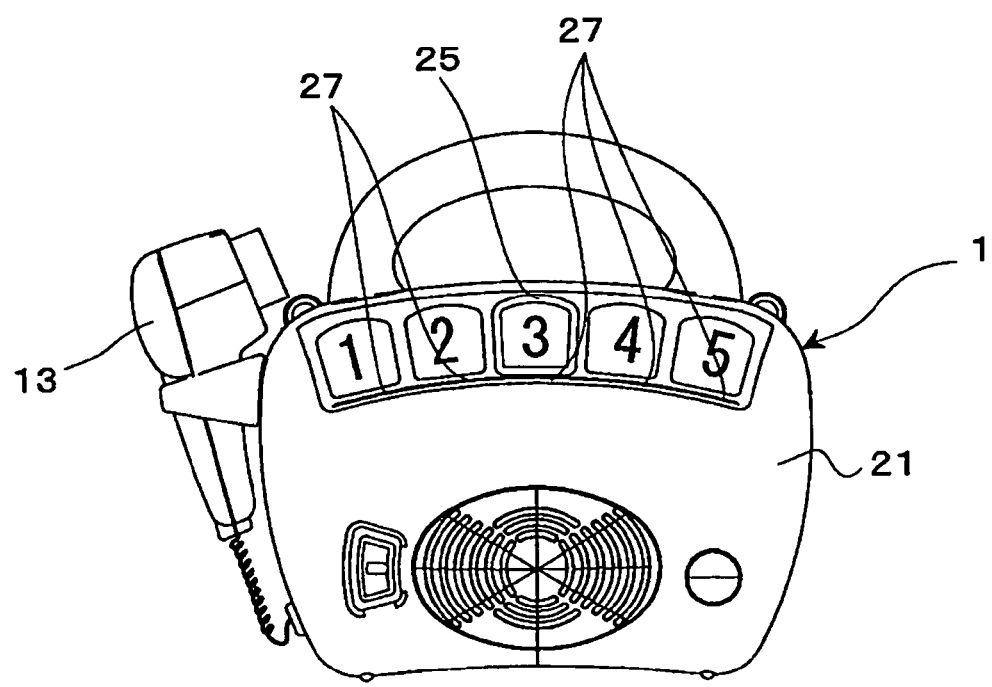
FIG. 6 is a view showing a state in which only one key member is inserted.

Also, on each of the front half body 21 and the rear half body 23 of the play toy device 3, five key member insertion sections 27 are formed in a row for allowing five key members 25 to be inserted respectively thereinto (FIG. 5, FIG. 6). FIG. 6 shows a state in which only a key member 25 of No. 3 is inserted. As shown in FIG. 6, each of the same numbers as each of those indicated on the top of the key members are indicated on each of the wall surface portions corresponding to the key member insertion sections 27 on the front half body 21, in order to indicate a key member 25 which can be inserted thereinto. When pictures are illustrated on the key top, it is preferred to illustrate each of the same pictures on each of the wall surfaces of the portions corresponding to the key member insertion sections 27 in the front half body 21. In this case, the player selects both of the key member 25 and the key member insertion section 27 while playing an image matching play. Thus the effect of intellectual education is enhanced.

Figure 7:
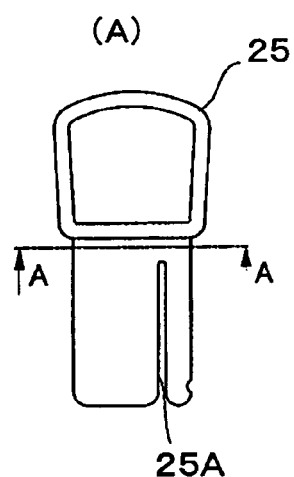
FIGS. 7(A) to (C) are a front elevation view, a rear elevation view and a cross sectional view taken along the line A-A, respectively, of a key member.
Figure 7:
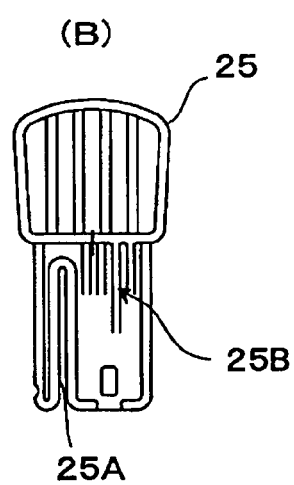
Figure 7:
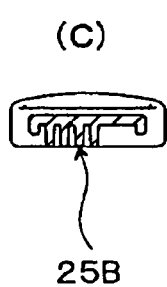

In FIGS. 7(A) to (C) are a front elevation view, a rear elevation view and a cross sectional view taken along the line A-A in FIG. 7(A), respectively, of the key member 25. In the key member 25, a slit 25A and a plurality of projections 25B formed at the rear thereof, are formed. By appropriately combining the position of the slit 25A and the number or length of the projections 25B, the key members can be distinguished from each other. Therefore, in the key member insertion section 27, at the positions corresponding to the slit 25A and the projections 25B, partition walls and grooves are formed respectively. As a result, since only the correct key member is allowed to be inserted into the key member insertion section, the key member can be prevented from being inserted into a wrong key member insertion section.

Figure 8:
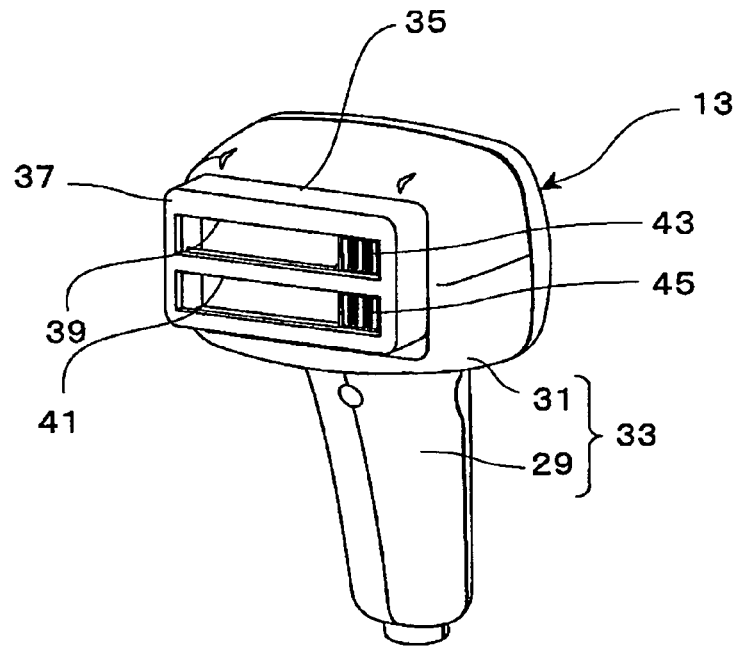
FIG. 8 is an enlarged perspective view of the barcode reader.
Figure 9:
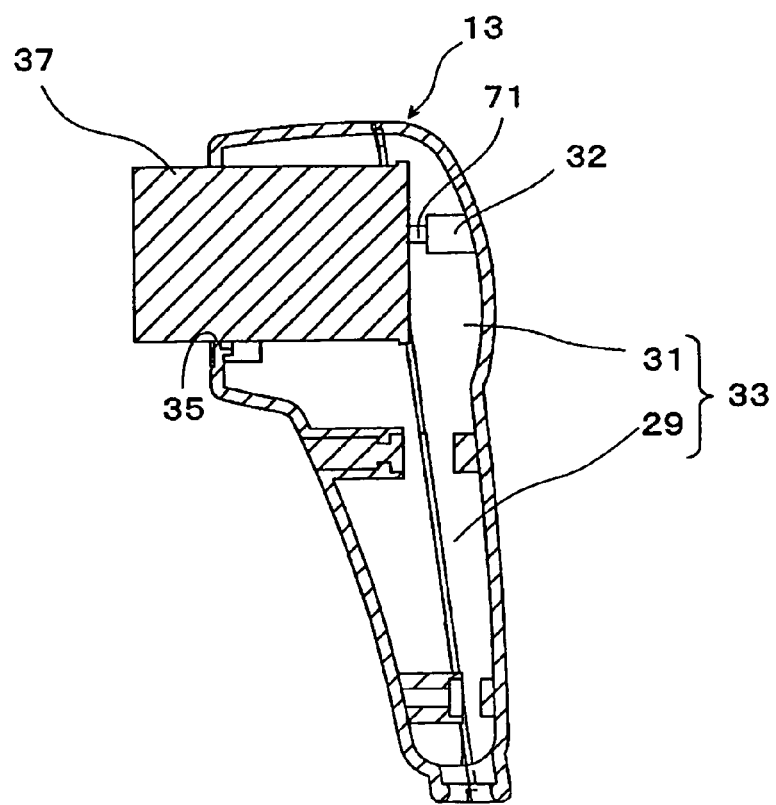
FIG. 9 is a longitudinal cross sectional view of the barcode reader showing a simplified screws and internal mechanism thereof.

FIG. 8 is an enlarged perspective view of the barcode reader 13, and FIG. 9 is longitudinal sectional view of the barcode reader 13, which schematically shows the screws and the internal mechanism. The barcode reader 13 has a reader body 33, which includes a handgrip section 29 and a sensor housing section 31. The sensor housing section 31 has an opening 35 at the front thereof. Within the sensor housing section 31, a box-like movable member 37 is received movably in the front-rear direction. The movable member 37 has two openings 39 and 41 extending parallel to each other in the lateral direction in the exposed end portion thereof; and inside the openings 39 and 41, as shown in FIG. 8, the first and second barcode sensors 43 and 45 are disposed movably in the lateral direction along the openings 39 and 41. The first and second barcode sensors 43 and 45 are commercially available sensors, in which a light emitting element and a light-receiving element are coupled. Reflected light beam of the light emitted from the light-emitting element toward the barcode is received by the light-receiving element, and the light-receiving element outputs signals corresponding to the pattern of the barcode.

Figure 10:
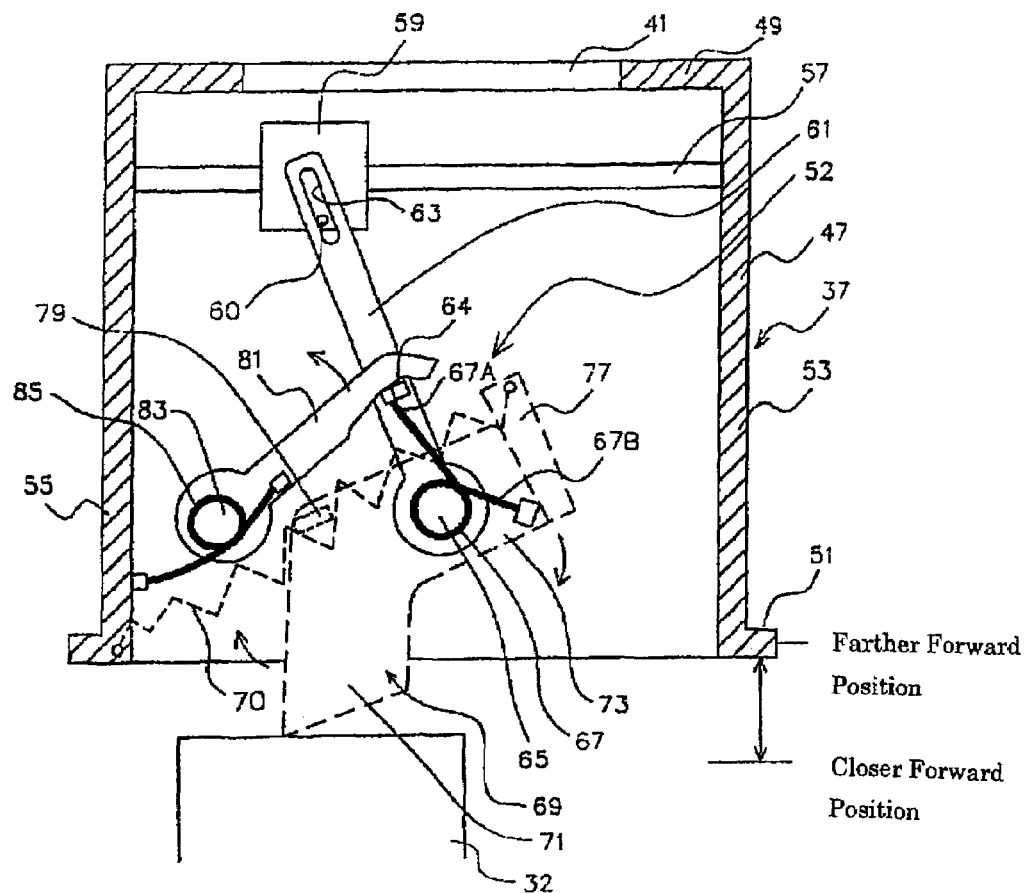
FIG. 10 is a cross sectional view schematically showing a state of the internal structure of a movable member positioned at farther forward position.
Figure 11:
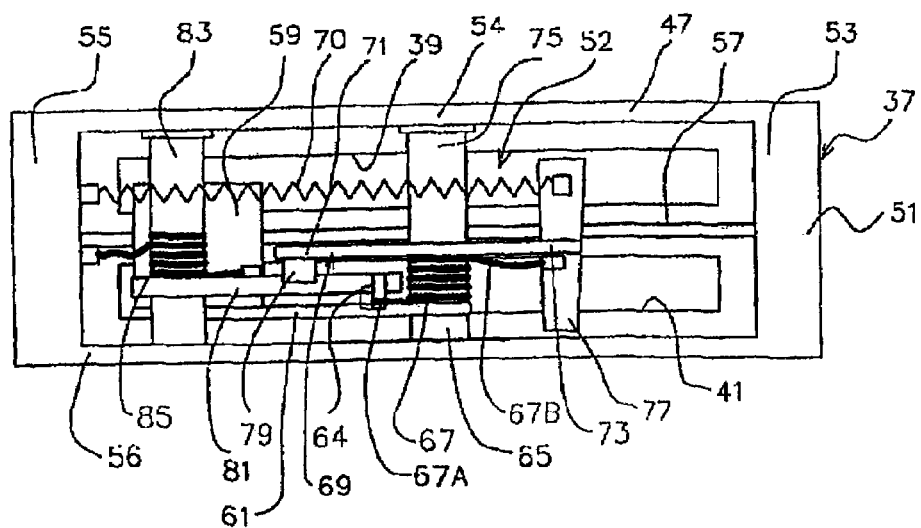
FIG. 11 is a schematic view of a state of the movable member viewed from the rear.
Figure 12:
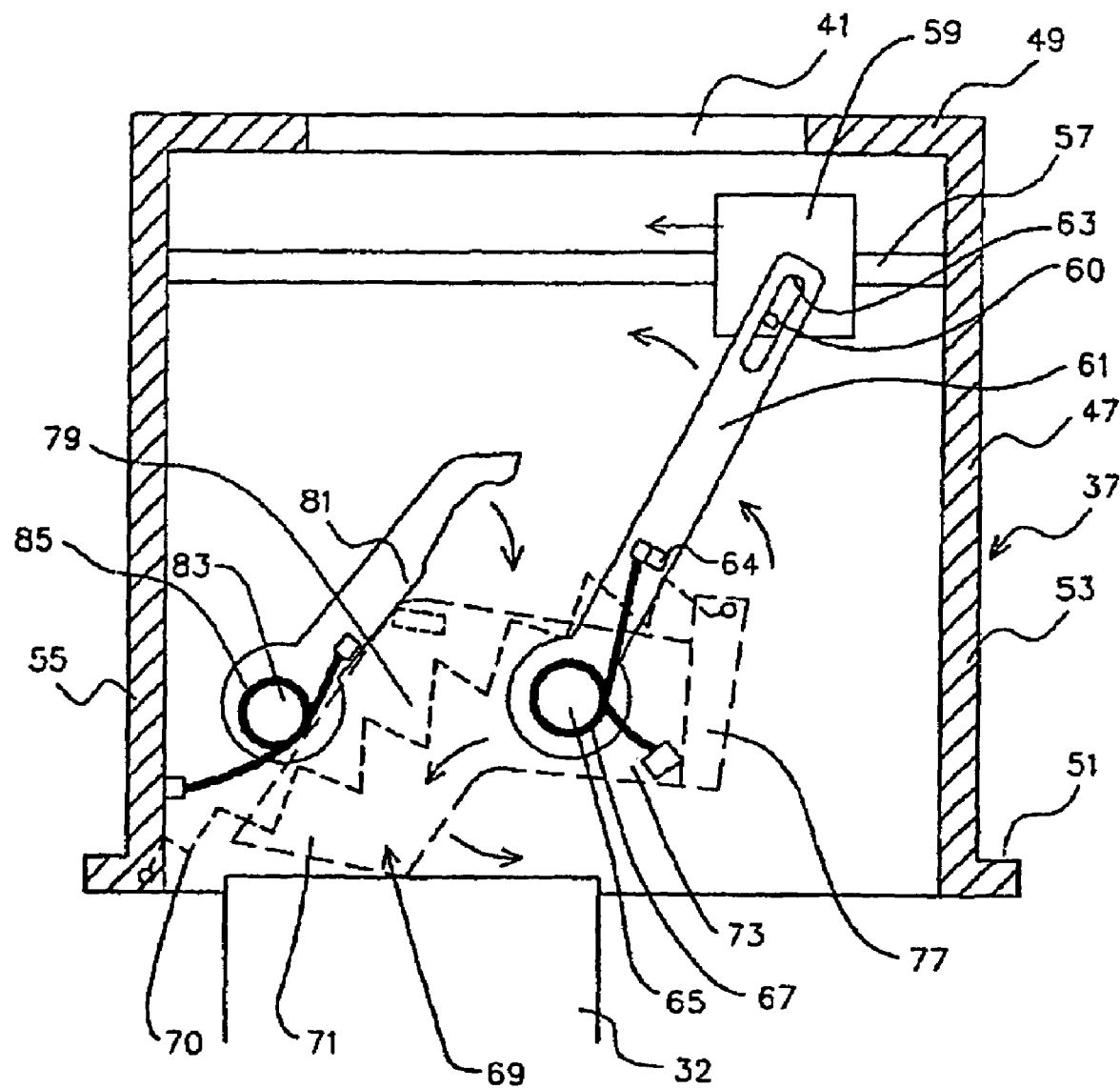
FIG. 12 is a view schematically showing a state of the internal structure of the movable member positioned at closer forward position.

FIG. 10 schematically shows a state of the internal structure of the movable member 37 positioned at a farther forward position. FIG. 11 is a schematic view of the movable member 37 viewed from the rear thereof. FIG. 12 schematically shows a state of the internal structure of the movable member 37 positioned at a closer forward position. In FIG. 10 and FIG. 12, in order to be easily understood, an energy-storing link 69 and a second spring 70 are indicated with imaginary lines. The movable member 37 has a housing 47 of which cross-section is a rectangular shape. The housing 47 has a wall portion 49 equipped with the above-described openings 39 and 41 at the front thereof, and has a flange 51 at the rear thereof. Inside the housing 47, a barcode sensor moving mechanism 52 is received.

The barcode sensor moving mechanism 52 has a guide member 57, which has a long column-like shape with a small diameter, and bridged extending in the lateral direction between a pair of side walls 53 and 55 of the housing 47. A barcode sensor holder 59 for holding the first and second barcode sensors 43 and 45 is slidably mounted onto the guide member 57. And one end of a rotation link 61 is slidably connected to the barcode sensor holder 59. An elongated slit 63 is formed at one end of the rotation link 61. A projection 60 fixed to the barcode sensor holder 59 is engaged movably in the slit 63. The other end of the rotation link 61 is rotatably provided to a rotation center axle 65, which is fixed to a pair of opposed walls 54 and 56 of the housing 47. When the rotation link 61 rotates centering on the rotation center axle 65, the barcode sensor holder 59 reciprocates along the guide member 57. By arranging as described above, the barcode sensor holder 59 moves being guided by the guide member 57. Therefore, the distance between the barcode sensor and the barcode does not change, thus the reading error can be avoided. Also, by employing such a structure that the rotation link 61 reciprocates centering on the rotation center axle 65, the barcode sensor holder is moved along the guide member 57, not only the structure of the link of the barcode sensor moving mechanism 52 can be made simply but also the moving speed of the barcode sensor holder 59 can be prevented from fluctuating. In this embodiment, the movement link mechanism is structured using the guide member 57 and the rotation link 61. In order to make the rotation link 61 reciprocate, in this embodiment, first and second springs (first and second energy storage means) 67, 70 are used. These first and second springs 67, 70 store the energy by means of an energy storing mechanism. The energy storing mechanism energizes the first spring 67 and the second spring 70 while the movable member 37 is being moved from the farther forward position (the position shown in FIG. 10) to the closer forward position (the position shown in FIG. 12).

The energy storing mechanism is constructed of the first and second springs 67, 70 and the energy-storing link 69. The energy-storing link 69 includes a first arm portion 71 and a second arm portion 73, and rotates within a predetermined angular range centering on the rotation center axle 65. As shown in FIG. 11, the energy-storing link 69 is integrally provided with a cylinder portion 75, which is rotatably engaged with the rotation center axle 65, and an engagement portion 77, which is integrally provided with the second arm portion 73. The engagement portion 77 extends in the direction perpendicular to the plate surface of the second arm portion 73. On the rear surface of the first arm portion 71, an engaging projection 79 is integrally provided. The first spring 67 constituting the first energy storage means is a coil spring formed with a hard metal wire wound in a cylindrical coil shape. One end 67A of the metal wire constituting the first spring 67 is fixed or hooked to the rotation link 61, and the other end thereof is fixed or hooked to the engagement portion 77 provided to the second arm portion 73 of the energy-storing link 69. As a result, as shown in FIG. 10, when the rotation link 61 does not rotate, the energy-storing link 69 rotates clockwise so that the first spring 67 is energized. The second spring 70 is also a coil spring, and one end thereof is fixed or hooked to the side wall 55 of the movable member 37, and the other end thereof is fixed or hooked to the engagement portion 77 provided to the second arm portion 73 of the energy-storing link 69. The second spring 70 is energized when the energy-storing link 69 rotates clockwise. When the movable member 37 moves from the state where the movable member 37 is located at the closer forward position shown in FIG. 12 to the farther forward position shown in FIG. 10, the energy of the second spring 70 is released. That is, in the state shown in FIG. 12, when the movable member 37 moves toward the farther forward position, i.e., while the barcode reader 13 is moved away from the article indicated with the barcode, the energy-storing link 69 is rotated counterclockwise by energy released from the second spring 70. Since the first arm portion 71 of the energy-storing link 69 abuts on a projecting portion 32 provided to the inner wall portion of the sensor housing section 31 of the reader body 33, when the energy-storing link 69 rotates counterclockwise, the movable member 37 moves to the farther forward position. Thus, the second spring 70 provides a driving force to return the movable member 37 from the closer forward position to the farther forward position.

A trigger mechanism is comprised of a trigger link 81 and a third spring 85. The trigger mechanism is arranged so that the energy of the first spring 67 is released, while the movable member 37 is being moved from the farther forward position toward the closer forward position (when changing from the state shown in FIG. 10 to the state shown in FIG. 12), when the movable member 37 has reached a predetermined position (ordinarily, immediately before the closer forward position),. To be more precise, the trigger link 81 is supported rotatably by the axle 83 so as to rotate centering on the axle 83. Both ends of the axle 83 are supported by the opposed wall portions 54 and 56 of the housing 47. One end of the third spring 85 is fixed or hooked to the trigger link 81, and the other end thereof is fixed or hooked to the side wall 55 of the housing 47. The third spring 85 is so constructed as to continuously impart a force for rotating the trigger link 81 clockwise to the trigger link 81.

As described above, in order to read the barcode, when the front end of the movable member 37 of the barcode reader 13 is pressed onto an article such as a sheet indicated with the barcode. Then, the movable member 37 is being moved with respect to the reader body 33 from the farther forward position to the closer forward position. The energy-storing link 69 rotates clockwise due to the force applied to the first arm portion 71 of the energy-storing link 69, which abuts on the projecting portion 32. Thus, the first and second springs 67 and 70 are energized. While the energy-storing link 69 rotates clockwise (immediately before reaching to the closer forward position), when the engaging projection 79 of the energy-storing link 69 pushes up the trigger link 81, the engagement between the trigger link 81 and the projection 64 formed on the rotation link 61 is released. When the engagement is released, the rotation link 61 rotates clockwise by energy released from of the first spring 67. As a result, the barcode sensor holder 59 moves along the guide member 57 to in a right direction as viewed in figures so that the barcode can be read out.

After completing to read the barcode, while the barcode reader 13 is lifted away from the article and pressing onto the article of the movable member 37 is released, the energy-storing link 69 rotates inversely by energy released from of the second spring 70. Thus, the movable member 37 is moved from the closer forward position to the farther forward position. In this process, the engagement between the engaging projection 79 of the energy storing link 69 and the trigger link 81 is released, and the trigger link 81 and the projection 64 of the rotation link 61 are engaged with each other again to prevent the rotation link 61 from rotating.

Figure 13:
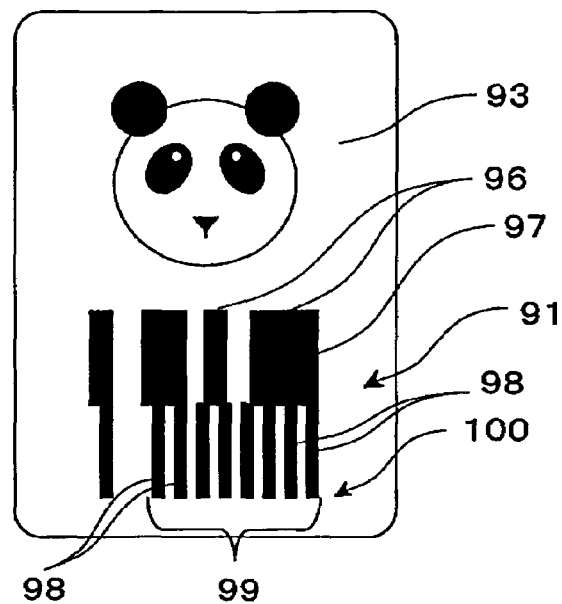
FIG. 13 is a top plan view of an article in which a barcode is printed on a card.
Figure 14:
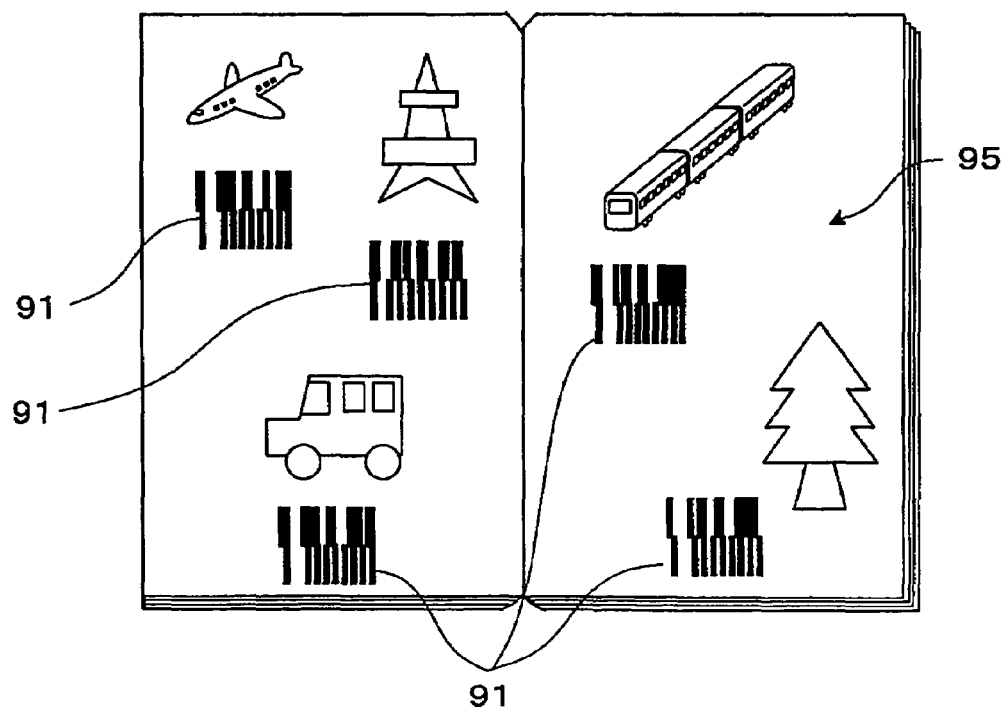
FIG. 14 is a view showing a state in which barcodes are printed corresponding to the pictures shown in a page of a book.

FIG. 13 shows a top plan view of an article with a barcode 91 printed on a card 93, and FIG. 14 is a view showing a state of barcodes 91 printed corresponding to the pictures on each page 95 of a book. As shown in FIG. 13, the barcode 91 used in this embodiment comprises a first barcode pattern 97, which includes information, and a second barcode pattern 100 disposed parallel to the first barcode pattern 97. The second barcode pattern 100 includes a reference barcode row 99, in which plural bars 98 with a constant width dimension are disposed at constant intervals. Each bar 96 of the first barcode pattern 97 is indicated with its position aligned with the plural bars 98 of the reference barcode row 99 of the second barcode pattern 100. As described above, the barcode reader 13 includes the first and second barcode sensors 43 and 45 for reading the first and second barcode patterns 97 and 100. If the information of the first barcode pattern can be obtained when a plurality of bars 98 included in a reference barcode row 99 in the second barcode pattern 100 is read out, it is ensured that necessary information can be read out from the first barcode pattern 97, even when the moving speed of the barcode sensor is not constant, as described in the embodiment.

Figure 15:
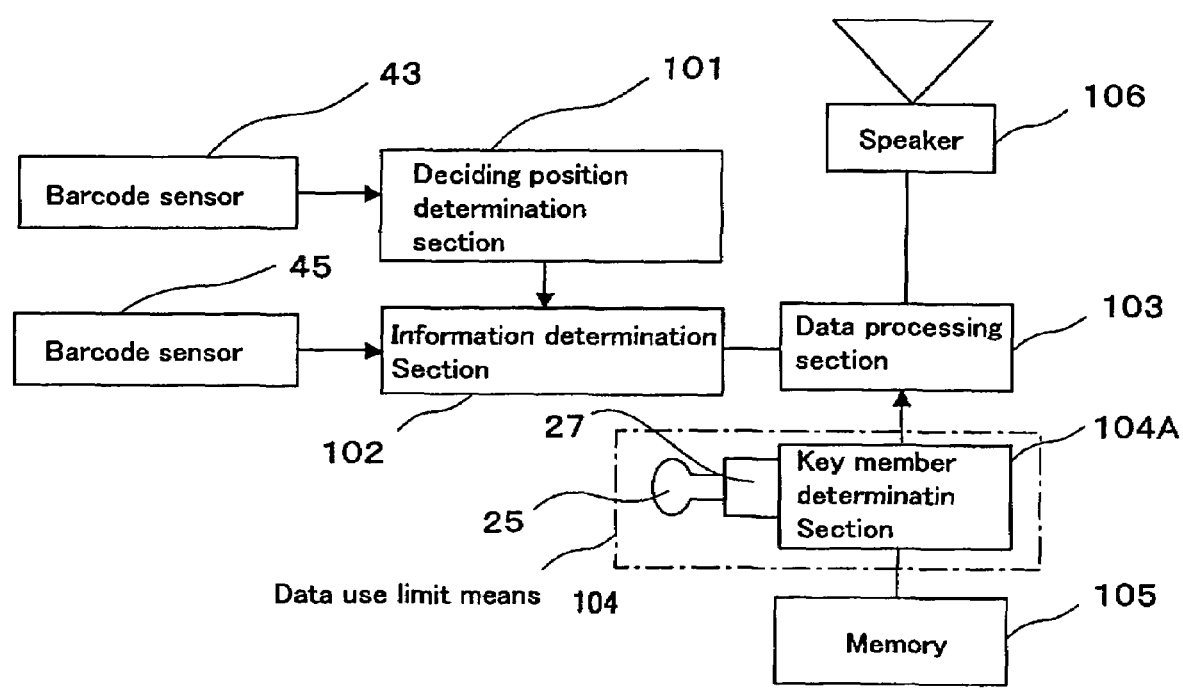
FIG. 15 is a block diagram showing a configuration of a signal processing circuit in the embodiment.

FIG. 15 is a block diagram showing a configuration of a signal processing circuit in accordance with the embodiment. Data signals are obtained by reading the second barcode pattern 100 using the first barcode sensor 43. The data signals are converted into data for indicating a deciding position where a deciding position determination section 101 decides the read out position of the barcode. Data signals are also obtained by reading the first barcode pattern 97 using the second barcode sensor 45. The data signals are determined by an information determination section 102. The information determination section 102 decides that the data obtained at the reading position is decided as correct information and performs determination processing. The reading position is decided by the deciding position determination section 101. The data processing section 103 processes the data determined by the information determination section 102. The memory 105 stores data necessary for data processing in the data processing section 103. For example, when play is carried out using a book as shown in FIG. 14, in the memory 105, sound presentation data in Japanese or foreign languages concerning the picture presented on the book and/or sound presentation data such as questions concerning the pictures are stored. A speaker 106 is a presentation means for presenting the processing result of the data processing section 103. The embodiment is particularly characterized in that a data use regulating means 104 for regulating the use of the data stored in the memory 105 is provided. The data use regulating means 104 includes ten key members 25, which is provided corresponding to the ten data groups (in a abstract manner, m types of groups: m is an integer) stored in the memory 105, and a key member insertion section 27, which allows the key members to be inserted thereinto (maximum ten keys). The data use regulating means 104 includes a key member determination section 104A, which determine what key member in the ten key members 25 is inserted and permits only the data group corresponding to an inserted key member to be used in the data processing section 103. When the data use regulating means 104 as described above is employed, it is necessary to select a key member 25 and the correct key member insertion section 27, into which the key member 25 should be inserted. Accordingly, a player playing with the play toy develops abilities of thinking. Also, since the data groups to be used by inserting the key member 25 are limited, the data processing section 103 performs only a simple data processing operation. Therefore, the data processing section may be constituted of an inexpensive microcomputer, which handles a small bit number. Accordingly the price of the play toy can be reduced.

The above-described embodiment is a case where the invention is applied to the play toy for intellectual education. Needless to say, the invention may be applied to other play toy equipped with a barcode reader (for example, register play toy and etc).

INDUSTRIAL APPLICABILITY

When the barcode sensor is moved by an energy storage means, which stores the energy while the movable member is moved as the power source as described above in this invention, the barcode reader does not have to be equipped with any electrical power source such as a motor or battery. Accordingly, the following advantages can be obtained. That is, not only the arrangement of the barcode reader may be structured simply but also the price of the barcode reader can be reduced, thus, the entire price of the play toy can be reduced.

The invention claimed is:

1. A play toy equipped with a barcode reader, which reads a barcode indicated on an article including a seal, card or book using a barcode reader provided with a barcode sensor, and develops play based on a barcode readout result, the barcode reader comprising:

a reader body;

a movable member formed with an opening for guiding light beams reflected from the barcode to the barcode sensor and movably held by the reader body so as to be relatively moved with respect to the reader body between a farther forward position and a closer forward position as viewed from the reader body; and a barcode sensor moving mechanism for moving the barcode sensor within a movable range corresponding to the opening without using electrical power, wherein the movable member is held by the reader body so as to be relatively moved with respect to the reader body from the farther forward position to the closer forward position while being pressed onto the article, and to be relatively moved with respect to the reader body from the closer forward position to the farther forward position when pressing of the movable member onto the article is released; and wherein the barcode sensor moving mechanism includes energy storage means which is energized while the movable member is being pressed onto the article, and is arranged so as to move the barcode sensor from one end to the other end of the opening using the energy released from the energy storage means.

2. The play toy equipped with a barcode reader according to claim 1, wherein the barcode sensor moving mechanism includes:

a guide member extending parallel to the opening;
a barcode sensor holder slidably mounted on the guide member for holding the barcode sensor; and
a rotation link having one end thereof rotatably mounted on a rotation center axle and the other end thereof slidably connected to the barcode sensor holder,
the rotation link rotating on the rotation center axle, thereby allowing the barcode sensor holder to reciprocate along the guide member.

3. The play toy equipped with a barcode reader according to claim 2, wherein the barcode includes a first barcode pattern including information, and a second barcode pattern including a reference barcode row constituted from a plurality of bars which have a constant width dimension and are disposed at constant intervals, and parallel with the first barcode pattern,
wherein each bar of the first barcode pattern is indicated, being aligned with the plurality of bars of the reference barcode row of the second barcode pattern; and
wherein the barcode reader includes first and second barcode sensors for reading the first and second barcode patterns respectively.

4. The play toy equipped with a barcode reader according to claim 2, further comprising:
a data processing section for processing data read out by the barcode reader;
a memory for storing data necessary for data processing in the data processing section;
display means for displaying result of data processing by the data processing section; and
data use regulating means for regulating the use of the data stored in the memory,
wherein the data use regulating means includes m key members (m is a positive integer), each provided corresponding to m types of data groups (m is a positive integer) stored in the memory, and a key member determination section having key member insertion sections, into which the m key members are respectively inserted, for determining whether or not the m key members are inserted so as to permit the data groups corresponding to the inserted key members to be used in the data processing section.

5. The play toy equipped with a barcode reader according to claim 3, wherein the barcode sensor moving mechanism includes:
an energy storing mechanism for energizing the first energy storage means and the second energy storage means while the movable member is being moved from the farther forward position toward the closer forward position,
a trigger mechanism for releasing the energy from the first energy storage means when the movable member has reached a predetermined position while the movable member is being moved from the farther forward position toward the closer forward position, and
a movement link mechanism for moving the barcode sensor from one end to the other end of the opening using the energy released from the first energy storage means, and from the other end to one end of the opening using the energy released from the second energy storage means when pressing of the movable member onto the article is released.

6. The play toy equipped with a barcode reader according to claim 5, wherein the barcode sensor and the barcode sensor moving mechanism are received inside the movable member; and wherein the energy storing mechanism is constructed in such a manner that a part of an energy storing link constituting the energy storing mechanism abuts on a part of the reader body, thereby causing the movable member to stay at the farther forward position when the movable member is not pressed onto the article, and the first energy storage means and the second energy storage means are energized using force applied to the energy storing link when the movable member is relatively moved with respect to the reader body while being pressed onto the article.

7. The play toy equipped with a barcode reader according to claim 5, wherein the movement link mechanism includes:
a guide member extending parallel to the opening;
a barcode sensor holder slidably mounted on the guide member for holding the barcode sensor; and
a rotation link having one end thereof rotatably mounted on a rotation center axle, and the other end thereof is slidably connected to the barcode sensor holder,
wherein the movement link mechanism is constructed in such a manner that the rotation link angularly turns on the rotation center axle, thereby allowing the barcode sensor holder to reciprocate along the guide member.

8. The play toy equipped with a barcode reader according to claim 5, wherein the energy storing mechanism includes:
an energy storing link having a first arm portion and a second arm portion and rotating within a prescribed angular range on the rotation center axle,
a first spring disposed between the rotation link and the energy storing link and having one end thereof fixed to the rotation link and the other end thereof fixed to the second arm portion, and
a second spring having one end thereof fixed to the movable member and the other end thereof fixed to the second arm portion; and
wherein the energy storing mechanism is constructed in such manner that the energy storing link is rotated due to the force applied to the first arm portion when the movable member is relatively moved from the farther forward position to the closer forward position, thereby energizing the first and second springs, and the energy storing link is reversely rotated due to the energy released from the second spring while pressing of the movable member onto the article is being released, thereby moving the movable member from the closer forward position to the farther forward position.

9. The play toy equipped with a barcode reader according to claim 1, wherein the barcode includes a first barcode pattern including information, and a second barcode pattern including a reference barcode row constituted from a plurality of bars which have a constant width dimension and are disposed at constant intervals, and parallel with the first barcode pattern,
wherein each bar of the first barcode pattern is indicated, being aligned with the plurality of bars of the reference barcode row of the second barcode pattern; and
wherein the barcode reader includes first and second barcode sensors for reading the first and second barcode patterns respectively.

10. The play toy equipped with a barcode reader according to claim 9, wherein the barcode sensor moving mechanism includes:
an energy storing mechanism for energizing the first energy storage means and the second energy storage means while the movable member is being moved from the farther forward position toward the closer forward position, a trigger mechanism for releasing the energy from the first energy storage means when the movable member has reached a predetermined position while the movable member is being moved from the farther forward position toward the closer forward position, and a movement link mechanism for moving the barcode sensor from one end to the other end of the opening using the energy released from the first energy storage means, and from the other end to one end of the opening using the energy released from the second energy storage means when pressing of the movable member onto the article is released.

11. The play toy equipped with a barcode reader according to claim 10, wherein the barcode sensor and the barcode sensor moving mechanism are received inside the movable member; and wherein the energy storing mechanism is constructed in such a manner that a part of an energy storing link constituting the energy storing mechanism abuts on a part of the reader body, thereby causing the movable member to stay at the farther forward position when the movable member is not pressed onto the article, and the first energy storage means and the second energy storage means are energized using force applied to the energy storing link when the movable member is relatively moved with respect to the reader body while being pressed onto the article.

12. The play toy equipped with a barcode reader according to claim 10, wherein the movement link mechanism includes:

a guide member extending parallel to the opening;

a barcode sensor holder slidably mounted on the guide member for holding the barcode sensor; and a rotation link having one end thereof rotatably mounted on a rotation center axle, and the other end thereof is slidably connected to the barcode sensor holder, wherein the movement link mechanism is constructed in such a manner that the rotation link angularly turns on the rotation center axle, thereby allowing the barcode sensor holder to reciprocate along the guide member.

13. The play toy equipped with a barcode reader according to claim 10, wherein the energy storing mechanism includes:

an energy storing link having a first arm portion and a second arm portion and rotating within a prescribed angular range on the rotation center axle, a first spring disposed between the rotation link and the energy storing link and having one end thereof fixed to the rotation link and the other end thereof fixed to the second arm portion, and a second spring having one end thereof fixed to the movable member and the other end thereof fixed to the second arm portion; and wherein the energy storing mechanism is constructed in such manner that the energy storing link is rotated due to the force applied to the first arm portion when the movable member is relatively moved from the farther forward position to the closer forward position, thereby energizing the first and second springs, and the energy storing link is reversely rotated due to the energy released from the second spring while pressing of the movable member onto the article is being released, thereby moving the movable member from the closer forward position to the farther forward position.

14. The play toy equipped with a barcode reader according to claim 1, further comprising:

a data processing section for processing data read out by the barcode reader;

a memory for storing data necessary for data processing in the data processing section;

display means for displaying result of data processing by the data processing section; and data use regulating means for regulating the use of the data stored in the memory, wherein the data use regulating means includes m key members (m is a positive integer), each provided corresponding to m types of data groups (m is a positive integer) stored in the memory, and a key member determination section having key member insertion sections, into which the m key members are respectively inserted, for determining whether or not the m key members are inserted so as to permit the data groups corresponding to the inserted key members to be used in the data processing section.

15. A play toy equipped with a barcode reader, which reads a barcode indicated on an article including a seal, card or book using the barcode reader provided with a barcode sensor, and develops play based on a barcode readout result, the barcode reader comprising:

a reader body;

a movable member formed with an opening for guiding light beams reflected from the barcode to the barcode sensor and movably held by the reader body so as to be relatively moved with respect to the reader body between a farther forward position and a closer forward position as viewed from the reader body; and a barcode sensor moving mechanism for moving the barcode sensor within a movable range corresponding to the opening without using electrical power, wherein the movable member is held by the reader body so as to be relatively moved with respect to the reader body from the farther forward position to the closer forward position while being pressed onto the article, and to be relatively moved with respect to the reader body from the closer forward position to the farther forward position when pressing of the movable member onto the article is released; and wherein the barcode sensor moving mechanism includes first and second energy storage means, which are energized while the movable member is being pressed onto the article, and is so constructed as to move the barcode sensor from one end to the other end of the opening using energy released from the first energy storage means, and to move the barcode sensor from the other end to the one end of the opening using energy released from the second energy storage means when pressing of the movable member onto the article is released.

16. A barcode reader for a play toy, comprising:

a reader body, a movable member formed with an opening for guiding light beams reflected from a barcode to a barcode sensor and movably held by the reader body so as to be relatively moved with respect to the reader body between a farther forward position and a closer forward position as viewed from the reader body, and a barcode sensor moving mechanism for moving the barcode sensor within a movable range corresponding to the opening without using electrical power, wherein the movable member is held by the reader body so as to be relatively moved with respect to the reader body from the farther forward position to the closer forward position while being pressed onto the article, and to be relatively moved with respect to the reader body from the closer forward position to the farther forward position when pressing of the movable member onto the article is released; and wherein the barcode sensor moving mechanism includes an energy storage means which is energized while the movable member is being pressed onto the article, and is arranged so as to move the barcode sensor from one end to the other end of the opening using energy released from the energy storage means.

17. A barcode readable with a barcode reader for a play toy set forth in claim 16, comprising:

a first barcode pattern including information; and a second barcode pattern including a reference barcode row constituted from a plurality of bars which have a constant width dimension and are disposed at constant intervals, and parallel with the first barcode pattern, wherein each bar of the first barcode pattern is indicated, being aligned with the plurality of bars of the reference barcode row of the second barcode pattern.

* * * * *